(12) United States Patent
Higgins

(10) Patent No.: US 10,578,371 B1
(45) Date of Patent: Mar. 3, 2020

(54) THERMAL BRIDGE FOR CHILLER PLANTS

(71) Applicant: Robert Higgins, Las Vegas, NV (US)

(72) Inventor: Robert Higgins, Las Vegas, NV (US)

( * ) Notice: Subject to any disclaimer, the term of this patent is extended or adjusted under 35 U.S.C. 154(b) by 166 days.

(21) Appl. No.: 15/407,452

(22) Filed: Jan. 17, 2017

(51) Int. Cl.
G05D 23/00 (2006.01)
F28D 20/00 (2006.01)
F25B 49/00 (2006.01)

(52) U.S. Cl.
CPC .......... *F28D 20/0034* (2013.01); *F25B 49/00* (2013.01); *F28D 2020/0065* (2013.01); *G05D 23/00* (2013.01)

(58) Field of Classification Search
CPC ......... F28D 20/0034; F25B 7/00; F25B 49/00
See application file for complete search history.

(56) References Cited

U.S. PATENT DOCUMENTS

| 4,173,994 A * | 11/1979 | Hiser .................. F25B 1/08 165/48.2 |
| 2007/0295489 A1* | 12/2007 | Tay .................. F24F 3/06 165/132 |
| 2009/0211280 A1 | 8/2009 | Alston |
| 2010/0199669 A1* | 8/2010 | Gathmann ........... F03G 6/005 60/641.8 |
| 2010/0252232 A1* | 10/2010 | Reich ................ F28D 20/0034 165/48.1 |
| 2011/0154838 A1* | 6/2011 | O'Brien ............ F24D 11/0214 62/132 |

FOREIGN PATENT DOCUMENTS

| RU | 2190813 | 10/2002 |
| RU | 2199706 | 2/2003 |

* cited by examiner

Primary Examiner — Ljiljana V. Ciric
Assistant Examiner — Alexis K Cox
(74) Attorney, Agent, or Firm — Lightbulb IP, LLC

(57) ABSTRACT

A thermal bridge utilizes a piping and operational strategy to provide chilled water to meet chiller plant demand during both thermal storage charge and discharge modes of operation. The thermal storage comprises a thermal storage device, such as a thermal storage tank. The thermal bridge includes a loop comprising one or more chillers and chilled water pumps that generate chilled water flow. Multiple operating modes for nominal, thermal storage charging, thermal storage charging and discharge, or thermal storage discharge are provided.

8 Claims, 5 Drawing Sheets

THERMAL BRIDGE FOR CHILLER PLANTS

BACKGROUND OF THE INVENTION

Field of the Invention

The invention relates to heating, ventilation and cooling (HVAC) systems and in particular to a piping and operational strategy for a thermal storage system (TSS).

Related Art

Various schemes for harnessing and storing solar hot water, traditionally generated hot water or chilled water exist.

From the discussion that follows, it will become apparent that the present invention addresses the deficiencies associated with the prior art while providing numerous additional advantages and benefits not contemplated or possible with prior art constructions.

SUMMARY OF THE INVENTION

A thermal bridge is disclosed herein. The thermal bridge utilizes a piping and operational strategy to provide chilled or hot water with improved utilization of thermal storage. Multiple operating modes may be selectively activated to provide more nuanced and advantageous utilization of thermal storage during chilled water production. Energy efficiency is improved by operating thermal storage according to these operating modes. The thermal bridge may be used with a chiller or boiler plant in its various embodiments.

Various systems relating to the thermal bridge are disclosed herein. For instance, in one exemplary embodiment, a thermal bridge for a chiller plant is disclosed. Such a thermal bridge may comprise a loop comprising one or more chillers that produce chilled water, one or more chilled water pumps, one or more outlet conduits and one or more inlet conduits. The thermal bridge also includes a de-coupler line, a thermal storage device on the de-coupler line and a controller.

The de-coupler line is in the loop and between the outlet conduits and the inlet conduits, and the de-coupler line opens and closes to water flow. During operation, the controller opens the de-coupler line, increases flow rate of the chilled water in the loop via the chilled water pumps, adjusts the flow rate of the chilled water in the loop according to a motor speed set point for the chillers and resets the motor speed set point based on a demand for the chilled water.

The thermal bridge may also include a distribution system connected to the outlet conduits and the inlet conduits. In addition, a valve may be included on the de-coupler line. In such case, the de-coupler line may be opened and closed via the valve. Also, one or more additional chillers may be connected to the loop in parallel. The controller may activate the additional chillers when increasing the flow rate of the chilled water, such as to rapidly charge the thermal storage device. The controller may also increase the flow rate of the chilled water to a maximum rate for such purposes.

The controller may deactivate the chillers and the chilled water pumps when a discharge mode is activated. In addition, it is noted that the controller may increase the flow rate of the chilled water when a charging mode is activated and reset the motor speed value when a charging and discharge mode is activated.

In another embodiment, a controller for a thermal bridge is disclosed, with such controller comprising one or more I/O devices in communication with one or more sensors and one or more chilled water pumps, and a processor. The processor operates the chilled water pumps to increase chilled water flow when a charging mode activated, adjusts the flow rate of chilled water in a loop according to a motor speed set point and resets the motor speed set point based on a demand for the chilled water when a charging and discharge mode is activated. A storage device of the controller may store the motor speed set point.

The processor may also activate one or more additional chillers when the charging mode is activated. Also, the processor may increase the flow rate of the chilled water to a maximum rate via the chilled water pumps when the charging mode is activated. The processor may deactivate the chillers, the chilled water pumps when a discharge mode is activated.

It is noted that the I/O devices may be in communication with a valve and the processor may then open the valve when the charging mode or the charging and discharge mode is activated. A controller may also include one or more communication devices, and if so, the charging mode, the charging and discharge mode and the discharge mode may be activated via the communication devices.

Various methods relating to the thermal bridge are also disclosed herein. For instance, in one exemplary embodiment, a method of providing chilled water supply with a thermal bridge is disclosed. Such a method comprises providing a de-coupler line including a thermal storage device, with the de-coupler line being attached to a loop comprising one or more chillers and one or more chilled water pumps.

The method also includes opening the de-coupler line, increasing a flow rate of the chilled water via the chilled water pumps when a charging mode is activated and adjusting the flow rate of the chilled water according as necessary to meet the demands of the system. The thermal storage device is charged with the chilled water when the charging mode or the charging and discharge mode is activated. The demand for chilled water may be detected with one or more sensors.

The chillers and the chilled water pumps may be deactivated when a discharge mode is activated. One or more additional chillers may be activated when the charging mode is activated. In addition, in some embodiments, the de-coupler line may be closed with a valve on the de-coupler line when a nominal mode is activated. A de-coupler line may also be closed by controlling the flow rate therethrough, such as be altering the speed of one or more chilled water pumps. The de-coupler line may be between an outflow conduit and an inflow conduit of the loop.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Figure 1:
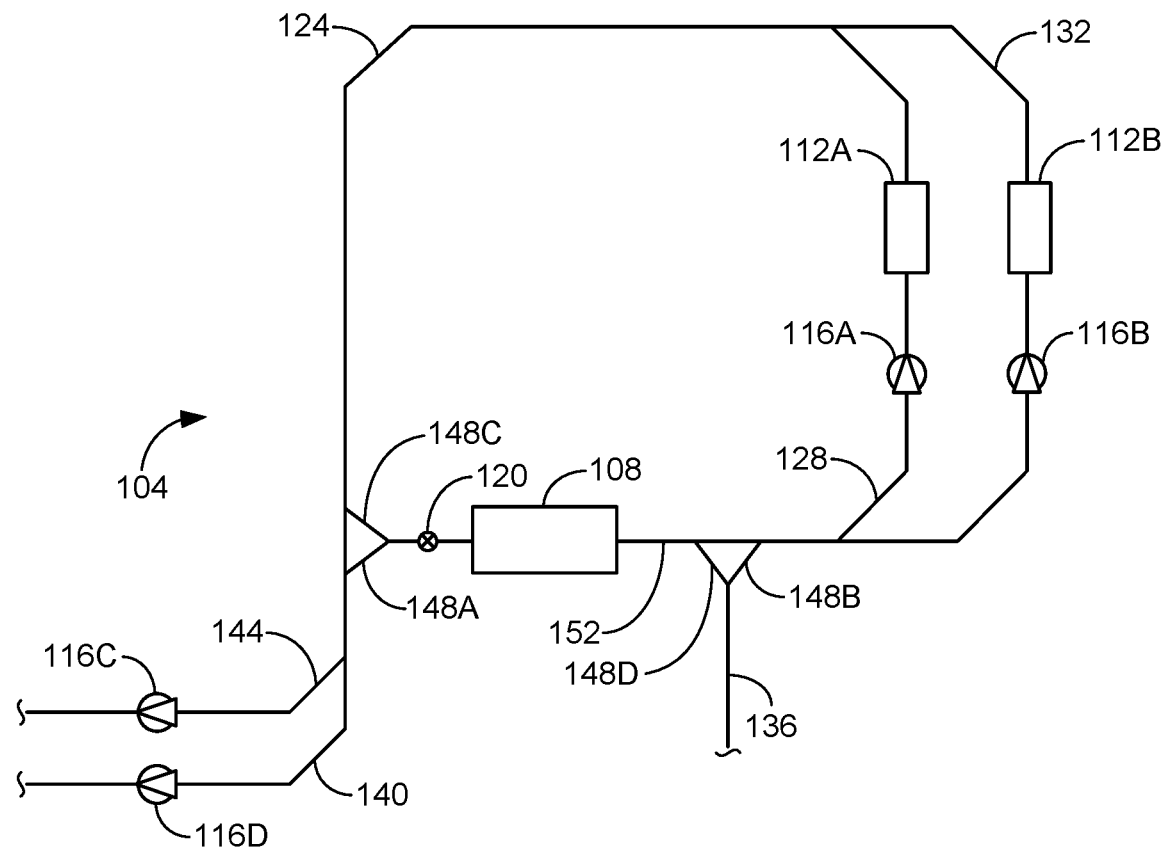
FIG. 1 is a block diagram illustrating an exemplary thermal bridge.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In a traditional primary/secondary system with a thermal storage tank in the de-coupler line, the thermal storage tank resides in the de-coupler line and the thermal storage tank is charged when the system is in excess production flow. When the thermal storage tank is discharged, its associated chillers are turned off and isolated. The secondary pumping system then pulls water through the thermal storage tank in order to provide cooling for the building and the system is in excess distribution flow.

A traditional system typically has low initial costs, easy installation and simple operation. Chiller plant demand ("KW") is dramatically reduced as the chillers, cooling towers and condenser water pump ("CHWP") are turned off. However, while "off" is an excellent way to conserve energy it is not always the best solution if cooling is desired. The temperature of the S-CHWS rises continually from the moment a thermal storage system ("TS") starts being used until the TS is completely discharged.

In an operating chiller plant, an ever-increasing chilled water supply ("CHWS") temperature during TS discharge would ensure very high flow rates in the distribution system as air handler unit ("AHU") valves open as they seek to maintain a supply air temperature ("SAT") set point. This degrades the operating delta t of a system along with its associated efficiencies. As such, within moments of instituting the TS system, the CHWS is always warmer than design and increases steadily as the TS is discharged. A normal discharge mode typically occurs during the heat of the day when the coldest water is needed to satisfy cooling load. Delivering warmer CHWS increases water pumping energy and air handler unit ("AHU") fan energy significantly. Accordingly, the longer a chiller plant's TS stays in discharge mode the more pumping and fan energy is required for a given cooling load.

The thermal bridge herein addresses these issues and provides selectable operating modes to better utilize a TS, thereby improving chiller plant efficiency. In one or more embodiments, a thermal bridge is implemented via a piping and operational strategy for chiller or other hydronic plants utilizing a TS where KW limits and design CHWS temperature are met at all times during the charge and discharge modes of operation. Typically, the thermal bridge will operate within a production loop of a chiller plant. The distribution loop or distribution system may be maintained by various control strategies.

The thermal bridge can be applied to a variety of chiller or hydronic operational strategies, while maintaining demand limit set points, design S-CHWS temperature and PSID, in both charge and discharge modes of operation. As will become apparent from the disclosure herein, the thermal bridge is advantageous for several reasons.

The TS discharges into the return side of the production loop instead of the supply side of the distribution loop (i.e., excess production flow). Chillers load/unload based upon their entering water temperature and flow rate. The amount of excess production flow, therefore KW, can be precisely controlled using this method. This is significant since the demand limit is typically accomplished in large steps as equipment is turned off, and comfort can degrade quickly as the TS warms from S-CHWR. In effect, the rate of TS charge and discharge can be controlled precisely to meet multiple levels of demand control.

Also, with the thermal bridge, a TS charges and discharges at the same time as long as its production loop is enabled. This phenomenon increases the time the TS system can provide effective demand limit control. A TS's charging demand limit can be controlled as well, such as by controlling the amount of excess production flow.

In effect, the rate of TS charging and discharging can be controlled precisely to meet multiple levels of demand control.

Distribution loop CHWS Temperature, PSID or other set points may be maintained while in a charge or discharge mode as long as the production loop is enabled. The temperature of the water entering the distribution loop does not increase as the TS is discharged. In addition, the plant is always in variable excess production flow when in charge or discharge mode. Comfort cooling is therefore significantly improved.

FIG. 1 is a block diagram illustrating an exemplary thermal bridge 104. As can be seen, a thermal bridge 104 may comprise a production loop 124 where CHWS is generated. A loop 124 will typically comprise one or more conduits or pipes connected to form a loop and to put various components of a thermal bridge 104 in fluid communication. As shown in FIG. 1 for example, a loop 124 may comprise one or more chillers 112A, 112B, chilled water pumps ("CHWP") 116A, 116B connected by pipes. Chillers 112A, 112B and associated CHWPs 116A, 116B may be on their own lines 128, 132 of a loop 124, and may be connected in parallel such as shown. A loop 124 will typically also include a de-coupler line 152. One or more TSs 108 and optional valves 120 may be on a de-coupler line 152. A de-coupler line 152 may also include one or more "pants legs" 148A, 148B, 148C, 148D such as shown. A valve 120 may be provided to restrict or shut off water flow to an adjacent part of the loop 124.

The thermal bridge's loop 124 will typically not contain any right angled conduits or pipes. As can be seen from FIG. 1, the piping forming the loop 124 contains bends that are less than or greater than 90 degrees. This reduces turbulence in water flow, increases pumping efficiency and thereby lowers energy utilization.

As discussed above, one or more pants legs 148A, 148B, 148C, 148D will typically be part of a loop 124 as well. Water may flow in each side or leg of a pants leg 148A, 148B depending on the flow rate of water in adjacent portions of the loop 124 or de-coupler line 152, as will be illustrated below with respect to FIGS. 3-6. Such flow rate may be controlled or changed by one or more valves 120, CHWPs 116A, 116B, outflow pumps 116C, 116D or other pumps.

CHWS may exit the loop 124 via one or more outflow conduits 140, 144. One or more outflow pumps 116C, 116D may be on the outflow conduits 140, 144 to provide chilled water flow to the distribution loop air handlers. The CHWS may be utilized for various purposes, but will typically be used in a cooling process for a building or other structure. To illustrate, CHWS may flow from the loop 124 to a secondary or distribution system, such as of a building, via the one or more outflow conduits 140, 144. After use, the now warmer CHWS or chilled water return ("CHWR") may leave the distribution system and return to the loop 124 via an inflow conduit 136.

Figure 2:
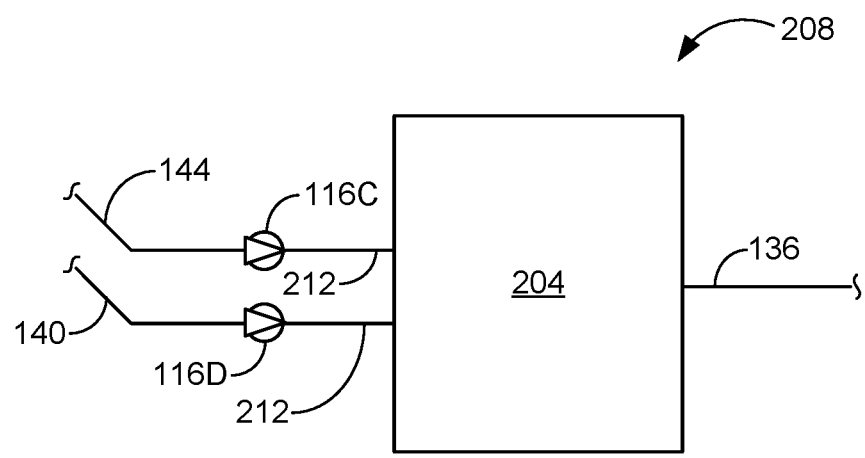
FIG. 2 is a block diagram illustrating an exemplary distribution system.

Referring to FIG. 2, a distribution system 208 may comprise one or more HVAC apparatuses and associated conduit 212, piping or other equipment therefore. As can be seen for instance, one or more outflow conduits 140, 144 may be connected to an HVAC apparatus 204 of a building or other structure(s) such that the HVAC apparatus receives chilled water from the outflow conduits. As stated, CHWS flow may be provided or assisted by one or more outflow pumps 116C, 116D. Once the chilled water is consumed or otherwise utilized by the HVAC apparatus 204, the now warmer water may exit the HVAC apparatus and return to the thermal bridge's loop via an inflow conduit 136. Though shown with a single HVAC apparatus 204, it is contemplated that multiple HVAC apparatuses may be connected.

The thermal bridge herein is advantageous in that a variety of HVAC apparatuses 204 may be utilized therewith. For example, an HVAC apparatus 204 may be a commercial or other chiller or refrigeration system, a building or campus chiller plant primary or secondary loop, an air handler unit, an air conditioning unit or the like. It is contemplated that the chilled water produced by the thermal bridge may be used directly for cooling or for subcooling a chiller to improve the efficiency and energy utilization thereof.

A distribution system 208 (and HVAC apparatuses 204) may operate according to its normal operating procedure but benefit from cooling or subcooling provided by the thermal bridge. For example, distribution system 208 comprising a chiller plant distribution or secondary loop may operate according to its own strategy.

Figure 3:
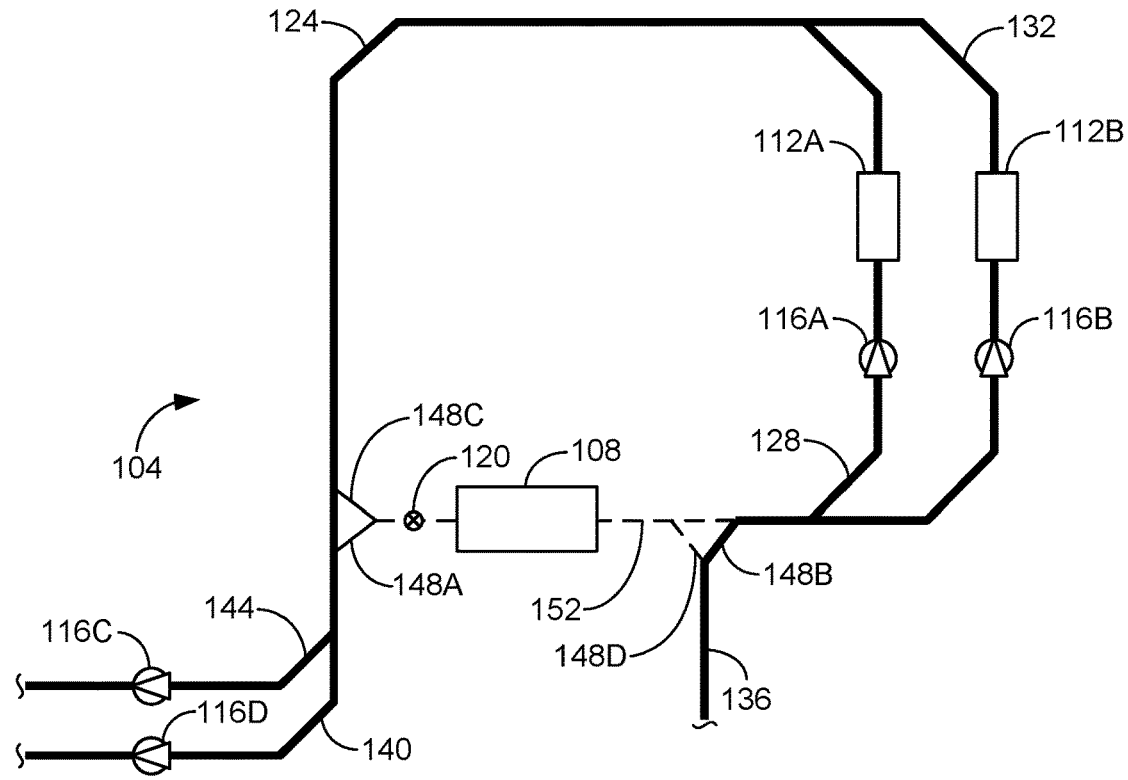
FIG. 3 is a block diagram illustrating an exemplary thermal bridge in a first mode of operation.
Figure 4:
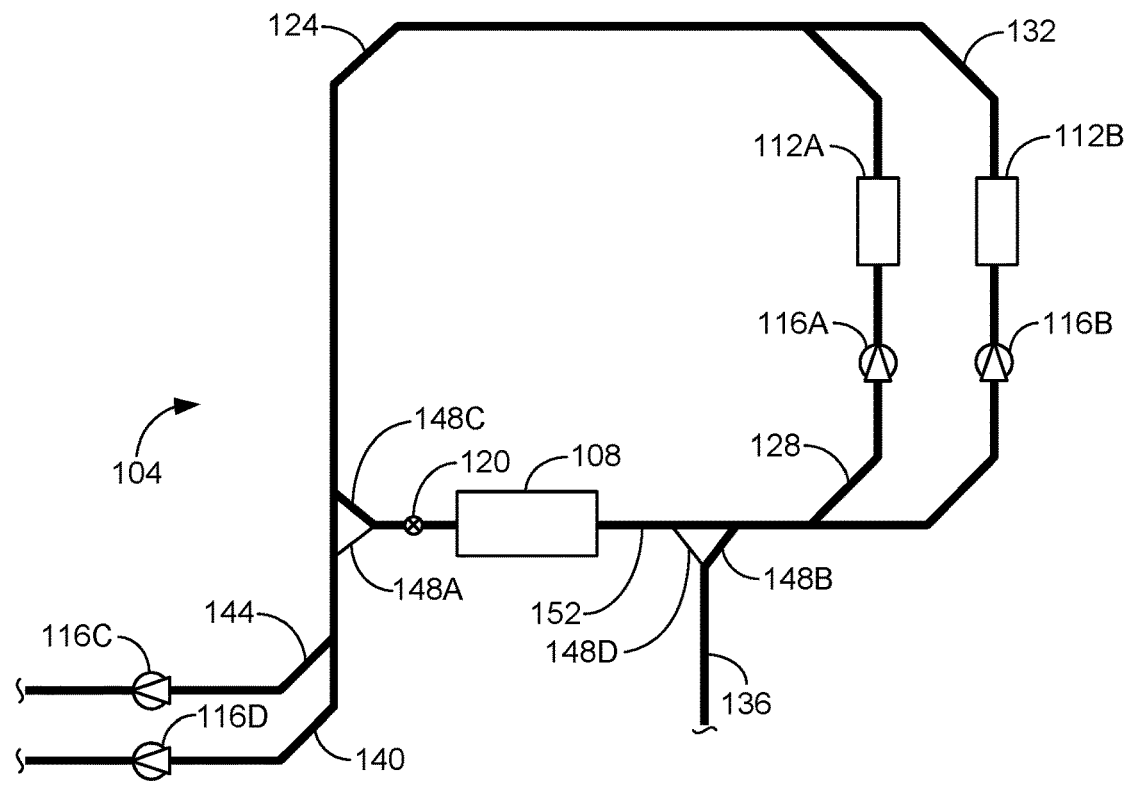
FIG. 4 is a block diagram illustrating an exemplary thermal bridge in a second mode of operation.
Figure 5:
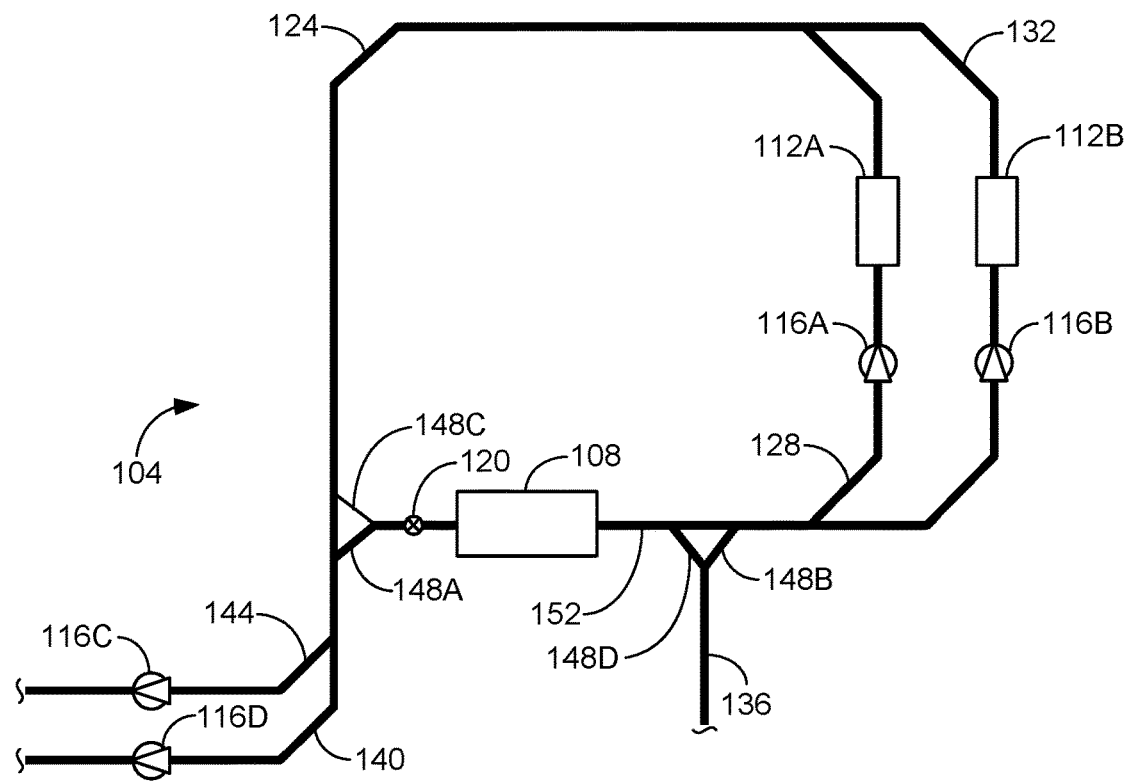
FIG. 5 is a block diagram illustrating an exemplary thermal bridge in a third mode of operation.

It is contemplated that a thermal bridge may operate in one or more distinct modes or in multiple modes simultaneously based on need. In one or more embodiments, three modes are provided, which will now be described with references to FIGS. 3-5. In FIGS. 3-5, primary water flow has been illustrated with the thicker solid line. Water flow may also be present in the portions of the loop 124 illustrated with a thinner solid line. The broken line portions of the loop 124 are shut off or lack water flow. In the various modes of operation, a distribution system 208 will typically be enabled and controlled according to its active PSID and S-CHWS temperature set points.

Mode One: Nominal Operation TS Disabled

FIG. 3 illustrates an exemplary thermal bridge 104 in normal or nominal operation whereby the production loop 124 is enabled and TS 108 disabled. In this mode, the loop 124 operates with a closed or balanced de-coupler line 152. As can be seen, the de-coupler line 152 lacks water flow (or meaningful water flow) when closed. It is noted that a de-coupler line 152 may be closed in various ways. For example, a de-coupler line 152 may be closed by closing a valve 120, such as shown in FIG. 3. Alternatively or in addition, flow rate through the loop 124 may be adjusted via one or more CHWPs 116A, 116B, outflow pumps 116C, 116D or other pumps to close or reduce water flow in a de-coupler line 152. In such an embodiment, it is noted that a valve 120 would not be required and may not be provided.

In mode one operation, chilled water supply ("CHWS") and chilled water return ("CHWR") flow is in the variable flow system, including the thermal bridge 104. Namely, CHWS through a loop 124 is being generated by one or more chillers 112A, 112B and the CHWS flow rate through the loop may be controlled by one or more CHWPs 116A, 116B. CHWS is sent to one or more HVAC apparatuses via one or more outflow conduits 140, 144 connected to the loop.

As described above, the CHWS is typically used in a distribution system to provide cooling, and then may return to the loop 124 via one or more inflow conduits 136. Flow rate through the outflow conduits 140, 144, inflow conduits 136 may be controlled by one or more pumps, such as one or more outflow pumps 116C, 116D. Such flow rate may be adjusted according to the distribution system being operated.

Mode Two: TS Variable Rate Charging, Normal Distribution Operation

FIG. 4 illustrates an exemplary thermal bridge 104 in TS charging mode, whereby one or more TSs 108 are charged, such as by introducing colder water into the TSs. In this mode, the production loop 124 is enabled and the TS 108 is undergoing charging at a variable rate. This mode focuses on the rate of TS 108 charging and any demand limit requirements. In general, the P-CHW PSID set point, the chiller CHW temperature set point and number of online chillers are manipulated to control the amount of excess production flow through the thermal bridge and TS (i.e., control the charging rate), the plant demand limit KW target, maintain a constant S-CHWS temperature or all or various subsets thereof.

As can be seen, when charging, a de-coupler line 152 and pants legs 148C, 148B are opened to water flow. This may occur in various ways. For example, water flow may be opened by opening a valve 120 at or on the de-coupler line 152. Alternatively or in addition, flow rate through the loop 124 may be adjusted via one or more CHWPs 116A, 116B, outflow pumps 116C, 116D or other pumps to generate or allow water flow in a de-coupler line 152. In one embodiment, a de-coupler line 152 may be opened by opening its valve 120, driving one or more CHWPs 116A, 116B to full speed or both. Driving the CHWPs 116A, 116B to full speed ensures excess CHWS flow in the loop 124.

One or more chillers 112A, 112B, CHWPs 116A, 116B and other corresponding equipment may be activated to charge a TS 108 within a predetermined period of time. For example, a thermal bridge 104 may normally operate with a primary chiller 112A, and have a secondary chiller 112B that is activated during mode two operation to charge one or more TS s 108. Additional chillers need not be used and may typically be used when rapid charging is desired.

Also, in mode two, the distribution system continues to operate as needed to operate one or more HVAC apparatus in the distribution system. As can be seen, CHWR and CHWS flow is in the inflow conduit 136, de-coupler line 152 and pants legs 148B, 148C pipes of the thermal bridge 104. In this manner, a TS 108 can be charged while a distribution system and associated HVAC apparatuses continue to function normally. The distribution system may operate according to its own operational strategy, as stated above.

Mode Three: TS Variable Rate Discharging, Normal Distribution Operation

FIG. 5 illustrates an exemplary thermal bridge 104 in a normal distribution operating mode and TS discharge mode. In this mode, the production loop 124 is enabled and the TS 108 is discharging at a variable rate. This mode focuses on the rate of TS 108 discharge in order to meet demand limit requirements. The P-CHW PSID set point, the chiller CHW temperature set point and number of online chillers are manipulated to control the amount of excess production flow through the thermal bridge and TS (i.e., control the charging rate), the plant demand limit KW target, maintain a constant S-CHWS temperature or all or various subsets thereof.

In this mode, a de-coupler line 152, inflow conduit 136 and pants legs 148C, 148D re opened, such as described above. One or more chillers 112A, 112B in the loop 124 may be reset to meet a particular KW target, such as a chiller plant KW target set to meet cooling demand at a building or other structure while discharging a TS 108.

To illustrate, in one exemplary embodiment, a plant chilled water ("P CHW") temperature set point may be reset based on the chiller plant KW target. The lower the KW target, the higher the P CHW temperature set point. The PCHW Pump Motor Speed Set Point may then be manipulated to control the amount of excess production flow through the charged TS 108 on the de-coupler line 152, and pants legs 148B, 148C that are necessary to maintain the chiller plant KW target. The distribution system continues to operate according to its operational strategy. CHWR and CHWS flow is through the de-coupler line 152, 148B, 148C of the thermal bridge 104.

The following table is provided to illustrate how PSID set point resets in modes three operation may be effectuated. Column B values may be used to reset CHWP motor speed set points as a chiller plant KW approaches the target values of Column C. Control according to P-CHWP motor speed set points provides for excess flow in the distribution loop thus discharging the TS tank, while at the same time providing chilled water from the production loop in controlled amounts as necessary to meet KW set point targets and system cooling requirements. Column A values may be used to reset S-CHWP motor speed set points as a chiller plant KW approaches the target values of Column C. Column D set point values may be used if the Column A and B pump motor speed reset fails to accomplish a desired KW reduction or if the TS's are depleted.

TABLE 1

Reset Values

| A<br>Outflow/Distribution<br>Pump Motor Speed<br>Set Point | B<br>P-CHW Pump<br>Motor<br>Speed Set Point | C<br>Max KW<br>Set Point | D<br>CHWS Set<br>Point For Online<br>Chillers (° C.) |
|---|---|---|---|
| −1 | 2.5 | −100 | 45 |
| −0.5 | 1.0 | −200 | 44 |
| 0 | 1.5 | −300 | 43 |
| 0 | 1.0 | −400 | 42 |
| 0 | 0.5 | −500 | 41 |

In operation, Column B may be used to reset the production PSID set point as the demand limit in a plant approaches the predetermined KW Limit Set Point in Column C. As flow is reduced through the production loop it is picked up in the thermal bridge as excess distribution flow. Column A could be substituted for Column B or be used simultaneously with Column B. Column D would be used as the last step in demand limit control if additional demand reduction is needed.

Mode Four: Full Discharge.

Figure 6:
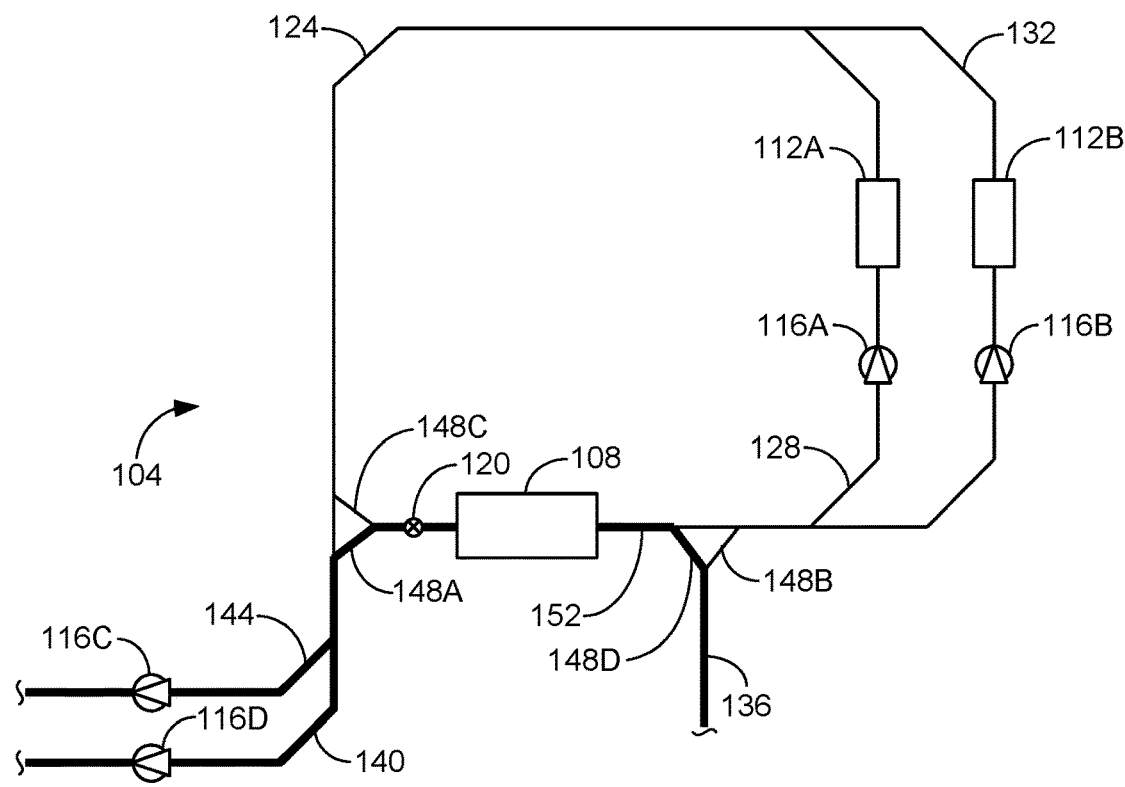
FIG. 6 is a block diagram illustrating an exemplary thermal bridge in a fourth mode of operation.

Referring to FIG. 6, a thermal bridge 104 may operate in a full discharge mode. In such mode, the loop 124 is isolated and the TS 108 discharged to minimize energy utilization, with the typical constraints of that strategy. Specifically, the production loop 124 is off and the TS 108 is undergoing full discharge. Also, full discharge mode is the only time that water is flowing through pants legs 148A, 148D. Typically, all or a selected subset of chillers 112A, 112B (and associated parasitic equipment) may be turned off. A de-coupler line 152 and pants legs 148D, 148A is opened to permit CHWR and CHWS to flow through the de-coupler line.

As can be seen, in full discharge mode, a distribution system may utilize CHWS stored in a TS 108. This saves energy. Also, it is contemplated that full discharge mode may be activated in an emergency situation, such as if one or more chillers 112A, 112B unexpectedly fail.

Figure 7:
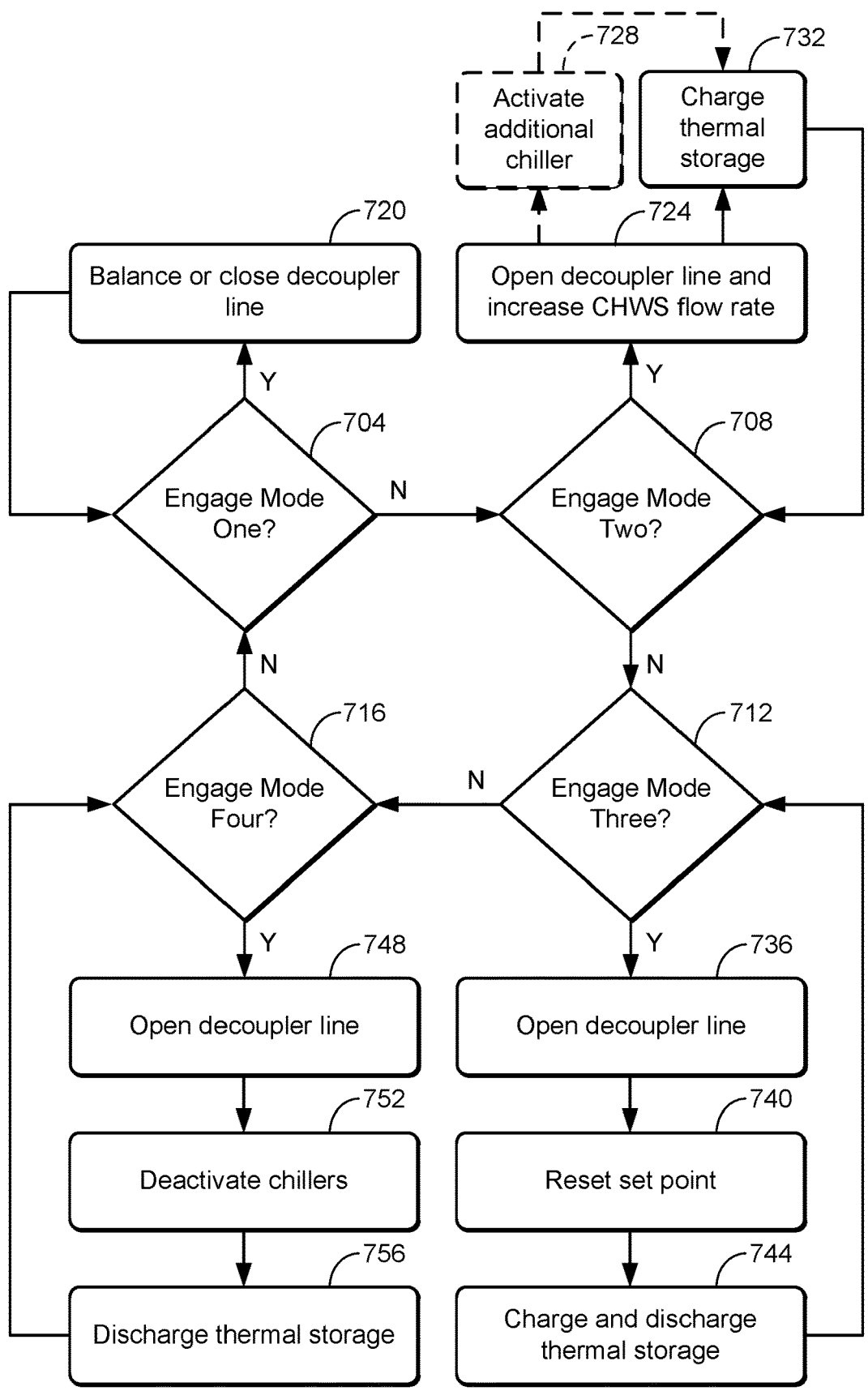
FIG. 7 is a flow diagram illustrating exemplary operation of a thermal bridge.

Operation of an exemplary thermal bridge will now be described with regard to the flow diagram of FIG. 7. As can be seen from interconnected decision steps 704, 708, 712, 716, a thermal bridge may cycle between various modes of operation. It is contemplated that a thermal bridge may start in a particular mode and move to other modes thereafter. In addition, a thermal bridge may stay in a particular operating mode as long as desired or until a change to another operating mode is triggered.

At a decision step 704, if mode one or normal operation is desired, a de-coupler line of the thermal bridge may be closed or balanced at a step 720. This may occur by closing a valve on the de-coupler line or by adjusting water flow rate, such as via one or more pumps. As described above, this is generally a nominal operating mode, whereby cooling is provided and a TS of the thermal bridge is not being charged.

It is noted that a thermal bridge may automatically enter into mode one operation based on the circumstances. Namely, if demand for cooling at the distribution system is balanced with production of CHWS at the thermal bridge's loop, the thermal bridge may automatically be in mode one operation. Alternatively, it is contemplated that a balanced mode of operation may be activated by adjusting water flow rate.

At a decision step 708, if mode two is desired, such as to charge the TS, a de-coupler line of the thermal bridge may be opened and CHWS flow rate may be increased at a step 724. The increased flow rate ensures excess flow in the thermal bridge's loop which allows CHWS to flow into the TS to charge the TS at a step 732. It is noted that one or more additional chillers may optionally be activated to charge a TS, such as at optional step 728.

In one or more embodiments, an additional chiller may be distinct from that of the primary chillers in the thermal bridge. For example, an additional chiller may be an adsorption chiller, while the primary chillers are traditional chillers. The adsorption chiller may be powered by solar energy, waste heat or other sources of heat, saving energy.

Like the other modes, mode two operation may be triggered or activated for various reasons. In one exemplary embodiment, mode two operation may be activated at decision step 708 when energy rates are off peak to charge a TS less expensively. As stated, or more additional chillers may be activated to more quickly charge a TS, such as during a predefined off peak energy price period. Typically, mode two will be used to charge a TS as quickly as possible or if necessary to achieve charging within a predefined period of time.

At a decision step 712, if mode three is desired, such as to charge a TS while providing CHWS to a distribution system, the de-coupler line may be opened at a step 736. The opening of the de-coupler line allows CHWS to enter the TS. At a step 740, one or more pump motor speed set points may be reset. The reset ensures the TS can be charged while delivering adequate CHWS to the distribution system for cooling purposes at a step 744. As described above, P CHW temperature may be set lower based on a chiller plant's current KW target, and may be adjusted to control the amount of excess CHWS through the TS.

Mode three operation may be triggered or activated to take advantage of off peak or lower energy rates as well. However, off peak rates are typically unlikely when there is demand for cooling. Advantageously, mode three operation may be triggered to take advantage of alternative energy sources, such as renewable energy and waste heat, which may be available at low rates while there is demand for cooling.

At a step 716, if mode four operation is desired, such as to utilize the TS to provide CHWS to the distribution system, the de-coupler line may be opened at a step 748. At a step 752, chillers and their CHWPs may be deactivated or shut off. The thermal bridge's loop is therefore isolated in that CHWS is being exclusively provided by the TS. The TS may be discharged to the distribution system at a step 756 with CHWR is flowing back to the TS.

Figure 8:
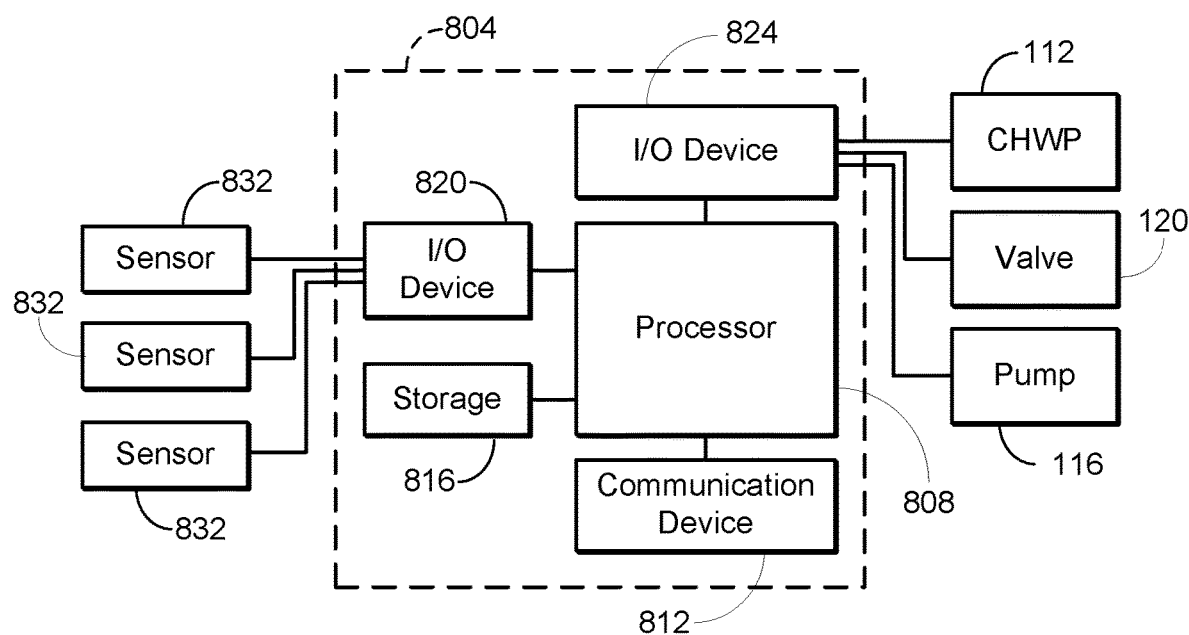
FIG. 8 is a block diagram illustrating an exemplary controller.

FIG. 8 illustrates an exemplary control device or controller 804 that may control components of a thermal bridge to function as disclosed herein. As can be seen, a controller 804 may comprise one or more processors 808. A processor 808 may be a microcontroller, microprocessor, circuit or the like.

A processor 808 may execute one or more instructions to provide the functionality disclosed herein. For example, a processor 808 may execute one or more instructions to control a thermal bridge as disclosed with regard to FIG. 7. Instructions may be hardwired into a processor 808, or fixed on a tangible storage medium, such as one or more storage devices 816. A storage device 816 may also store data for operating a controller 804. For example, motor speed set points, motor speed reset information, sensor information or other information may be stored on a storage device 816. Some exemplary storage devices 816 include solid state, optical or magnetic storage devices. A storage device 816 may be part of a processor 808 in some embodiments, or may be a separate component.

One or more I/O devices 820, 824 are provided to send data, receive data or both. For example, a controller 804 may receive sensor information from one or more sensors 832, such as temperature, flow rate, KW or other sensors, via an I/O device 820. Exemplary sensor information includes CHWS, CHWR or other temperatures, water flow rates, KW consumption and the like. In addition, a controller 804 may send commands to control various components, such as one or more CHWPs 112 or other pumps 116, valves 120 or other equipment. In one or more embodiments, commands may be received by and control operation of a variable frequency drive ("VFD") of the component. An I/O device 820, 824 may communicate via one or more wired or wireless communication links.

An optional communication device 812 may be provided to permit communication with other devices via one or more wired or wireless communication links. For example, a communication device 812 may provide communication with a computer or terminal to permit the controller to be setup, monitored, operated, updated or maintained. Alternatively or in addition, a controller 804 may have its own input and output devices, such as a keyboard, pointer device and screen for setup, monitoring, operation, updates and maintenance. It is contemplated that one or more modes of operation may be activated when an instruction for the same is received at a communication device 812.

A controller 804 may be provided or setup with instructions or rules (that will typically be stored on a storage device 816) defining when a particular mode of operation should be engaged. For example, activation of a particular mode of operation may be triggered or activated when sensor information meeting predefined criteria is received from one or more sensors 832. In addition, a controller 804 may transmit commands during operation, such as via an I/O device 820, 824 to open or close a de-coupler line, activate or deactivate chillers and other equipment.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A thermal bridge in a chiller plant, the chiller plant comprising a loop comprising one or more chillers that produce chilled water, one or more chilled water pumps, one or more outlet conduits, and one or more inlet conduits, the thermal bridge comprising:
   a de-coupler line comprising a thermal storage device, the de-coupler line disposed in the loop and between the one or more outlet conduits and the one or more inlet conduits, wherein the de-coupler line is operable to open and close to water flow;
   a controller having instruction that, when executed, cause the controller to:
   increase the flow rate of the chilled water in the loop via the one or more chilled water pumps to generate a flow of the chilled water through the de-coupler line to charge the thermal storage device;
   adjust the flow rate of the chilled water in the loop via the one or more chilled water pumps according to a motor speed set point; and
   reset the motor speed set point based on a plurality of demand targets for the chiller plant.

2. The thermal bridge of claim 1, wherein adjusting the flow rate of the chilled water adjusts a rate at which the thermal storage device is charged.

3. The thermal bridge of claim 1 further comprising a valve on the de-coupler line, wherein the de-coupler line opens and closes via the valve.

4. The thermal bridge of claim 1 further comprising one or more additional chillers connected to the loop in parallel, wherein the instructions, when executed, cause the controller to activate the one or more additional chillers when increasing the flow rate of the chilled water.

5. The thermal bridge of claim 1, wherein the instructions, when executed, cause the controller to increase the flow rate of the chilled water to a maximum rate.

6. The thermal bridge of claim 1, wherein the instructions, when executed, cause the controller to deactivate the one or more chillers and the one or more chilled water pumps based on the plurality of demand targets for the chiller plant.

7. The thermal bridge of claim 1, wherein the instructions, when executed, cause the controller to increase the flow rate of the chilled water when a charging mode is activated.

8. Machine readable code in a controller for a thermal bridge in a chiller plant, the thermal bridge comprising a de-coupler line in turn comprising a thermal storage device, the de-coupler line disposed in a loop of the chiller plant and between one or more outlet conduits of the loop and one or more inlet conduits of the loop, wherein the de-coupler line is operable to open and close to water flow, the machine readable code including instructions that, when executed, cause the controller to:
- increase the flow rate of the chilled water in the loop via one or more chilled water pumps of the chiller plant to generate a flow of the chilled water through the de-coupler line to charge the thermal storage device;
- adjust the flow rate of the chilled water in the loop via the one or more chilled water pumps according to a motor speed set point; and
- reset the motor speed set point based on a plurality of demand targets for the chiller plant.

\* \* \* \* \*

UNITED STATES PATENT AND TRADEMARK OFFICE
CERTIFICATE OF CORRECTION

PATENT NO. : 10,578,371 B1  
APPLICATION NO. : 15/407452  
DATED : March 3, 2020  
INVENTOR(S) : Robert Higgins Page 1 of 1

It is certified that error appears in the above-identified patent and that said Letters Patent is hereby corrected as shown below:

In the Claims

Column 10, Line 34, "instruction" should read --instructions--;

Column 10, Line 36, "increase the flow rate" should read --increase flow rate--.

Column 11, Line 8, "increase the flow rate" should read --increase flow rate--.

Signed and Sealed this  
Fifth Day of May, 2020

Andrei Iancu  
*Director of the United States Patent and Trademark Office*